US009659072B2

United States Patent
Gorelik et al.

(10) Patent No.: US 9,659,072 B2
(45) Date of Patent: *May 23, 2017

(54) CREATION OF CHANGE-BASED DATA INTEGRATION JOBS

(71) Applicant: International Business Machines Corporation, Armonk, NY (US)

(72) Inventors: Alexander Gorelik, Palo Alto, CA (US); Sriram K. Padmanabhan, San Jose, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,886

(22) Filed: Jan. 29, 2016

(65) Prior Publication Data

US 2016/0147851 A1 May 26, 2016

Related U.S. Application Data

(63) Continuation of application No. 13/946,335, filed on Jul. 19, 2013, now Pat. No. 9,305,067.

(51) Int. Cl.
*G06F 17/30* (2006.01)
*G06F 9/48* (2006.01)
*G06F 9/50* (2006.01)

(52) U.S. Cl.
CPC ...... *G06F 17/30563* (2013.01); *G06F 9/4881* (2013.01); *G06F 9/5005* (2013.01);
(Continued)

(58) Field of Classification Search
CPC ......... G06F 17/30563; G06F 17/30595; G06F 9/4881; G06F 9/5005; G06F 8/75;
(Continued)

(56) References Cited

U.S. PATENT DOCUMENTS 6,032,158 A    2/2000  Mukhopadhyay et al.
6,604,110 B1   8/2003  Savage et al.
(Continued)

OTHER PUBLICATIONS

Thomas Jorg and Stefan Dessloch—"Formalizing ETL Jobs for Incremental Loading of Data Warehouses"—in Proceedings der 13. Gl-Fachtagung Fur Datenbanksysteme in Business, Technologie und Web, Lecture Notes in Informatics, vol. P-144, 2. bis 6. Marz 2009, Munster, Germany, pp. 327-346 (1-20). ISBN 978-3-88579-238-3.*

(Continued)

*Primary Examiner* — Anh Ly
(74) *Attorney, Agent, or Firm* — David B. Woycechowsky (57) ABSTRACT

A computer software implemented method for transforming a first extract transform load (ETL) job having at least some unload transform load (UTL) portions. The method includes the following steps: (i) decomposing the first ETL job into an intermediate set of one or more jobs; and (ii) for each job of the intermediate set, transforming the job into a transactionally equivalent job to yield a final set of one or more jobs. The decomposing is performed so that each job of the intermediate jobs set is a Simple UTL job. The transforming is performed so that each job of the final set includes no UTL portions.

2 Claims, 5 Drawing Sheets

(52) U.S. Cl.
CPC ........ *G06F 17/30* (2013.01); *G06F 17/30368* (2013.01); *G06F 17/30575* (2013.01)

(58) Field of Classification Search
CPC ........ G06F 17/30368; G06F 17/30575; G06F 9/46; G06F 17/30; G06Q 10/10; G06Q 10/06; G06Q 50/22; G06Q 30/02; G06Q 30/0201; H01L 2924/0002; H01L 2924/00; H01L 51/56; H01L 51/0005; H01L 27/3211; H01L 33/005
See application file for complete search history.

(56) References Cited

U.S. PATENT DOCUMENTS

| | | | |
|---|---|---|---|
| 6,999,977 | B1 | 2/2006 | Norcott et al. |
| 7,058,615 | B2 | 6/2006 | Yao |
| 7,191,183 | B1 | 3/2007 | Goldstein |
| 7,370,033 | B1 | 5/2008 | Roychowdhury |
| 7,681,185 | B2 | 3/2010 | Kapoor et al. |
| 7,720,804 | B2 * | 5/2010 | Fazal ............... G06F 17/30554 707/601 |
| 7,761,406 | B2 * | 7/2010 | Harken ............... G06F 17/303 707/602 |
| 7,870,016 | B2 * | 1/2011 | Fazal ............... G06Q 10/0637 705/7.36 |
| 8,200,614 | B2 | 6/2012 | Syed et al. |
| 8,214,324 | B2 | 7/2012 | Joerg et al. |
| 8,577,833 | B2 | 11/2013 | Erla et al. |
| 2002/0099563 | A1 | 7/2002 | Adendorff et al. |
| 2003/0108195 | A1 | 6/2003 | Okada et al. |
| 2003/0115207 | A1 | 6/2003 | Bowman et al. |
| 2003/0135478 | A1 * | 7/2003 | Marshall ........... G06F 17/30339 707/E17.005 |
| 2004/0044671 | A1 | 3/2004 | Yoshimura et al. |
| 2004/0083199 | A1 | 4/2004 | Govindugari et al. |
| 2004/0215584 | A1 | 10/2004 | Yao |
| 2004/0249644 | A1 | 12/2004 | Schiefer et al. |
| 2004/0254948 | A1 | 12/2004 | Yao |
| 2005/0055369 | A1 | 3/2005 | Gorelik et al. |
| 2005/0160065 | A1 | 7/2005 | Seeman |
| 2005/0243604 | A1 * | 11/2005 | Harken ............... G06F 8/51 365/185.22 |
| 2006/0112278 | A1 | 5/2006 | Cohen et al. |
| 2006/0112280 | A1 | 5/2006 | Cohen et al. |
| 2007/0074155 | A1 * | 3/2007 | Ama ............... G06F 17/30563 717/106 |
| 2007/0195952 | A1 | 8/2007 | Singanamala |
| 2007/0239508 | A1 | 10/2007 | Fazal et al. |
| 2007/0276712 | A1 * | 11/2007 | Kolanchery ........... G06Q 10/06 705/7.23 |
| 2008/0172674 | A1 * | 7/2008 | Yee ............... G06F 9/5038 718/106 |
| 2008/0228697 | A1 | 9/2008 | Adya et al. |
| 2008/0307386 | A1 * | 12/2008 | Chen ............... G06F 11/1471 717/109 |
| 2009/0055370 | A1 | 2/2009 | Dagum et al. |
| 2009/0077005 | A1 * | 3/2009 | Yung ............... G06F 9/4443 707/E17.005 |
| 2009/0276449 | A1 | 11/2009 | Syed et al. |
| 2009/0313311 | A1 | 12/2009 | Hoffmann et al. |
| 2010/0083274 | A1 * | 4/2010 | Green ............... G06F 9/4881 718/105 |
| 2010/0114841 | A1 * | 5/2010 | Holenstein ........ G06F 17/30306 707/690 |
| 2010/0153351 | A1 * | 6/2010 | Yung ............... G06F 17/30377 707/703 |
| 2010/0191884 | A1 | 7/2010 | Holenstein et al. |
| 2010/0211539 | A1 | 8/2010 | Ho |
| 2010/0280990 | A1 * | 11/2010 | Castellanos ....... G06F 17/30592 707/602 |
| 2010/0281440 | A1 * | 11/2010 | Underkoffler ........... G06F 3/017 715/863 |
| 2011/0047525 | A1 | 2/2011 | Castellanos et al. |
| 2011/0055147 | A1 * | 3/2011 | Joerg ............... G06F 9/4843 707/602 |
| 2011/0072319 | A1 * | 3/2011 | Agarwal ............. G06F 11/3604 714/49 |
| 2011/0320985 | A1 * | 12/2011 | Byrne ............... G06F 17/30557 715/853 |
| 2012/0221536 | A1 * | 8/2012 | Chen ............... G06F 17/30581 707/702 |
| 2012/0290527 | A1 | 11/2012 | Yalamanchilli |
| 2013/0104099 | A1 | 4/2013 | Gores et al. |
| 2013/0173529 | A1 | 7/2013 | Erla et al. |
| 2014/0279838 | A1 | 9/2014 | Tsirogiannis et al. |
| 2015/0026115 | A1 | 1/2015 | Gorelik et al. |
| 2016/0062790 | A1 * | 3/2016 | Greene ............... G06F 8/75 718/101 |

OTHER PUBLICATIONS

Len Wyatt, Brian Caufield, and Daniel Pol—"Principles for an ETL Benchmark"—R. Nambiar and M. Poess (Eds.): TPCTC 2009, LNCS 5895, pp. 183-198, 2009.—© Springer-Verlag Berlin Heidelberg 2009.*

Zhang, et al. "Generating Incremental ETL Processes Automatically", Proceedings of the First International Multi-Symposiums on Computer Computational Sciences (IMSCCS'06), Copyright 2006 IEEE.

"Extract, transform, load", Wikipedia, the free encyclopedia, page last modified Mar. 18, 2013, <http://en.wikipedia.org/w/index.php?title=Extract,_transform,_load&oldid=545266783>.

Huamin Wang and Zhiwei Ye—"An ETL Services Framework Based on Metadata"—Published in: Intelligent Systems and Applications (ISA), 2010 2nd International Workshop on—Date of Conference: May 22-23, 2010—Conference Location: Wuhan—pp. 1-4.

Andreas Behrend and Thomas Jorg—"Optimized Incremental ETL Jobs for maintaining data warehouses"—Proceeding IDEAS '10 Proceedings of the Fourteenth International Database Engineering & Applications Symposium—IDEAS10, Aug. 16-18, 2010, Montreal, QC (Canada)—pp. 216-224.

* cited by examiner

CREATION OF CHANGE-BASED DATA INTEGRATION JOBS

CROSS-REFERENCE TO RELATED APPLICATIONS

This patent application claims priority from U.S. patent application Ser. No. 13/946,335 (now U.S. Pat. No. 9,305,067, filed Jul. 19, 2013 and entitled "CREATION OF CHANGE-BASED DATA INTEGRATION JOBS") which priority application is hereby incorporated herein by reference in its entirety.

FIELD OF THE INVENTION

The present invention relates generally to the field of change-based data integration jobs, and more particularly to creating change-based data integration jobs.

BACKGROUND OF THE INVENTION

"Extract-transform-load" data integration jobs are known. More specifically, ETL jobs that include Unload-Transform-Load (UTL) portions are known. The concept of UTL will be discussed in more detail, below, in the DETAILED DESCRIPTION section of this document. Roughly speaking, Extract-Transform-Load (ETL) refers to a process in database usage, and especially in data integration, that involves: (i) extracting data from outside sources; (ii) transforming the extracted data to fit operational requirements (for example, quality levels); and (iii) loading the transformed data into the end target, such as a database. ETL processes generally entail considerable complexity, and problems sometimes occur due to improperly designed ETL systems.

Patterns for implementing complex transformations are well understood when creating ETL jobs (specifically, ETL jobs that include UTL portions). Many companies will have a significant investment in: (i) intellectual property in the form of ETL job-related code; and/or (ii) human resources who have training and experience in creating ETL jobs. The patterns for implementing complex transformations for a change-based job (CTL) are very different and are much less well understood. Few data integration job developers are experienced in this area. This makes it more difficult for businesses to move from a full load model (that is, ETL job with significant UTL portions) model to a change-based model (that is, CTL data integration job).

An ETL job (that includes UTL portions) traditionally relies on processing correlated tables (at least to the extent that the ETL job has UTL portions). A CTL job is not generally applied to correlated tables. This means that the standard strategies used in other automated transformations of ETL jobs (such as the Balanced Optimizer) cannot be used to convert an ETL job in equivalent CTL job(s).

The concept of "transformationally equivalent ETL jobs" will now be discussed. An ETL job defines a series of transformations taking data from a source database and moving it to a target database. The ETL job thus defines a specific transformational relationship between the respective data in the source and target databases. In many practical situations, there may be many ETL jobs which define the same transformational relationship. Conventionally, an optimal ETL job is defined, or re-used, for a given business situation. Determination of the optimal ETL job is conventionally based upon: (i) performance requirements; and/or (ii) other nonfunctional requirements. One of the ways that transformationally equivalent ETL jobs may differ, from each other, is in how much of the transformation processing is done in the target database and how much is done internally in the ETL tool itself. There is existing functionality (called the Balanced Optimizer) which can analyze an ETL job and provide a transformationally equivalent ETL job which has moved more of the transformation processing from the body of the ETL job to the target database.

SUMMARY

According to an aspect of the present invention, there is a method for transforming a first extract transform load (ETL) job having at least one unload transform load (UTL) portion. The method includes the following steps (not necessarily in the following order): (i) decomposing the first ETL job into an intermediate set of one or more Simple UTL jobs; and (ii) for each Simple UTL job of the intermediate set, transforming the job into a transformationally equivalent job to yield a final set of one or more jobs that are not UTL jobs. Each Simple UTL job of the intermediate set jobs meets the following criteria: (i) a single input action retrieves the contents of a single table, or view on a single table, in a database, (ii) contains no actions that operate on the entirety of data for a job, (iii) contains no actions that rely on ordering of data, and (iv) at least one output stage operates on a database.

According to a further aspect of the present invention, there is a computer program product method for transforming a first extract transform load (ETL) job having at least one unload transform load (UTL) portion. The computer program product includes software stored on a software storage device. The software includes: (i) first program instructions programmed to decompose the first ETL job into an intermediate set of one or more Simple UTL jobs; and (ii) second program instructions programmed to, for each Simple UTL job of the intermediate set, transform the job into a transformationally equivalent job to yield a final set of one or more jobs that are not UTL jobs. Each Simple UTL job of the intermediate set jobs meets the following criteria: (i) a single input action retrieves the contents of a single table, or view on a single table, in a database, (ii) contains no actions that operate on the entirety of data for a job, (iii) contains no actions that rely on ordering of data, and (iv) at least one output stage operates on a database. The software is stored on a software storage device in a manner less transitory than a signal in transit.

According to a further aspect of the present invention, there is a computer system for transforming a first extract transform load (ETL) job having at least one unload transform load (UTL) portion. The computer system includes: a processor(s) set; and a software storage device. The processor set is structured, located, connected and/or programmed to run software stored on the software storage device. The software includes: (i) first program instructions programmed to decompose the first ETL job into an intermediate set of one or more Simple UTL jobs, and (ii) second program instructions programmed to, for each Simple UTL job of the intermediate set, transform the job into a transformationally equivalent job to yield a final set of one or more jobs that are not UTL jobs. Each Simple UTL job of the intermediate set jobs meets the following criteria: (i) a single input action retrieves the contents of a single table, or view on a single table, in a database, (ii) contains no actions that operate on the entirety of data for a job, (iii) contains no actions that rely on ordering of data, and (iv) at least one output stage operates on a database.

DETAILED DESCRIPTION

This DETAILED DESCRIPTION section is divided into the following sub-sections: (i) The Hardware and Software Environment; and (ii) Embodiment(s) of the Present Invention.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures.

Figure 1:
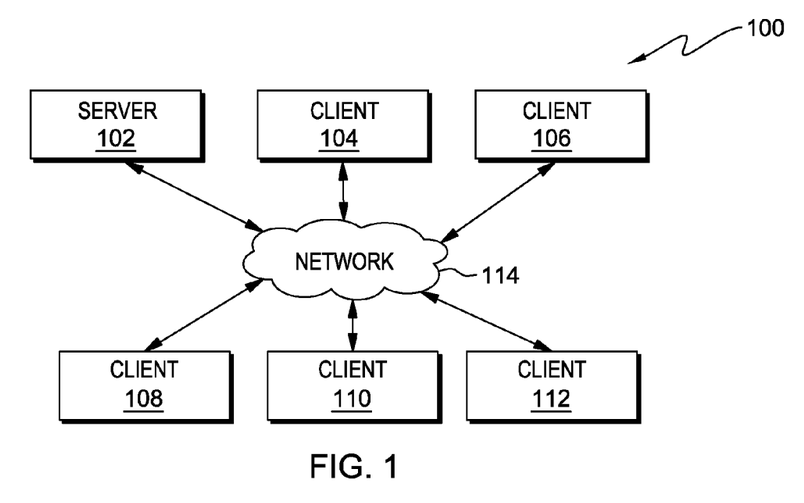
FIG. 1 is a schematic view of a first embodiment of a computer system (that is, a system including one or more processing devices) according to the present invention.
Figure 2:
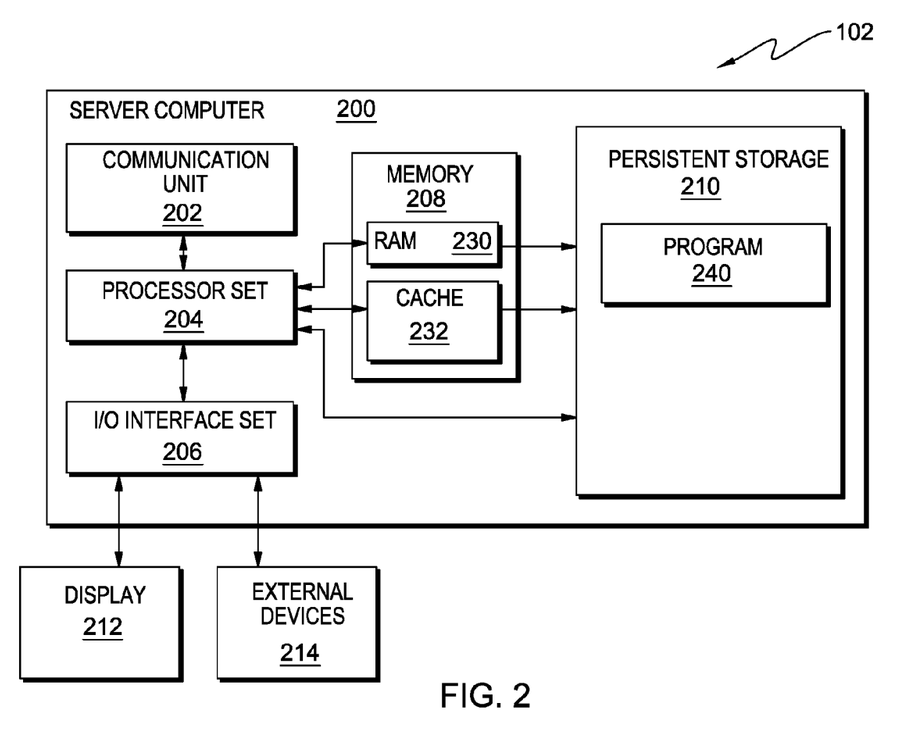
FIG. 2 is a schematic view of a computer sub-system (that is, a part of the computer system that itself includes a processing device) portion of the first embodiment computer system.

FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a representative piece of software, and is a collection of machine readable instructions and data that is used to create, manage and control certain software functions that will be discussed in detail, below, in the Embodiment(s) sub-section of this DETAILED DESCRIPTION section.

As shown in FIGS. 1 and 2, server computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is in many respects representative of the various software modules of the present invention and is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

As shown in FIGS. 1 and 2, communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

As shown in FIG. 2, I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Embodiment(s) of the Present Invention

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
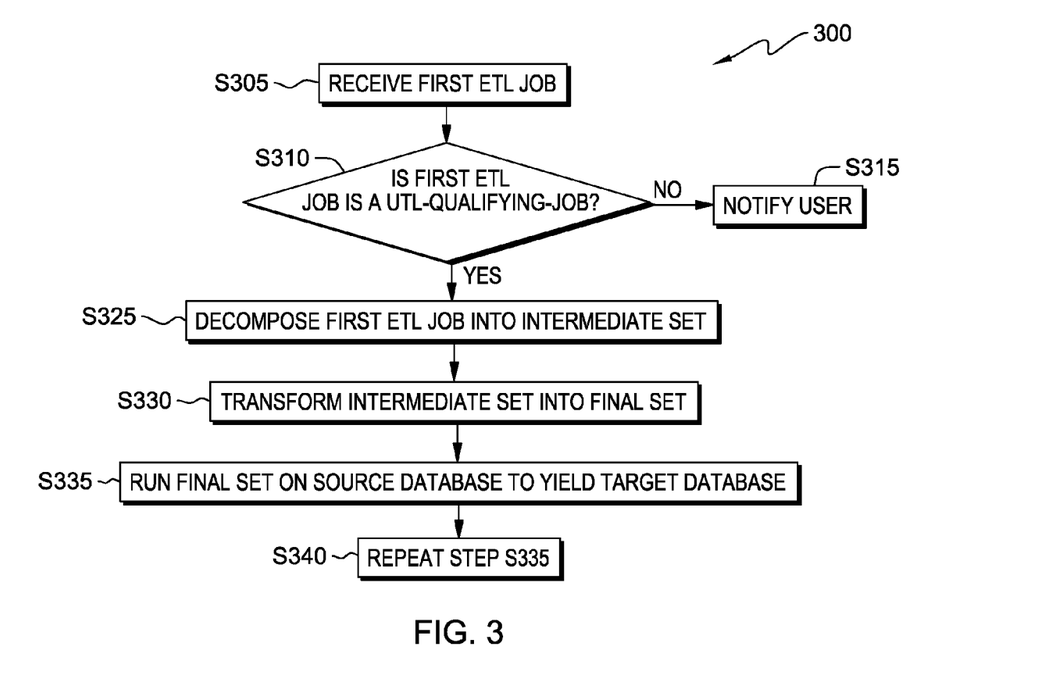
FIG. 3 is a flowchart showing a process performed, at least in part, by the first embodiment computer system.
Figure 4:
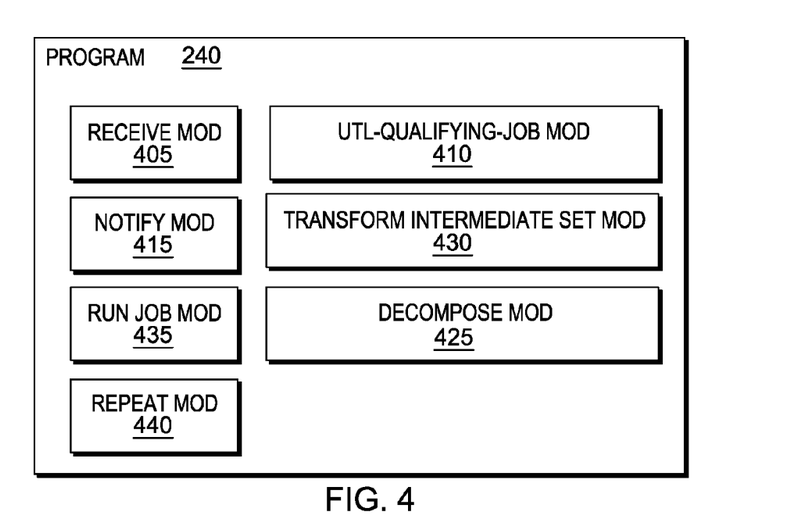
FIG. 4 is a schematic view of a portion of the first embodiment computer system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

As shown in FIGS. 3 and 4, processing may start at step S305 where receive module (mod) 405 may receive a first ETL job. This is the job that may be converted to CTL and run as (one or more) CTL job(s) according to the present invention. The concepts of ETL, CTL and UTL jobs will be discussed in further detail, below. This ETL job may have been a long pre-existing job that a company has long used, but now wants to convert to CTL. Alternatively, the first ETL job may be new, and may have been recently written in ETL form (including UTL portions) because that is form and/or protocol with which the employees and/or contractors are familiar. In either case, this embodiment of the present invention helps by automatically and substantially without substantial human intervention, converting the first ETL job to CTL form and protocol, with the attendant advantages that CTL form and protocol can provide. In some embodiments, the first ETL job may be received by mod 405 of program 240 of server computer 200 (see FIG. 2) from one of the client computer sub-systems 104, 106, 108, 110, 112 through network 114 (see FIG. 1).

As shown in FIGS. 3 and 4, processing proceeds to step S310 where UTL-qualifying-job mod 410 may determine whether the first ETL job is qualified to be converted to CTL (that is, whether it is a UTL-qualifying-job) by this embodiment of the present invention. A particular method for determining whether a given ETL job is a UTL-qualifying-job will be discussed in detail, below. For now, it should be understood that, in this embodiment of the present invention, some ETL jobs qualify, but others do not.

As shown in FIGS. 3 and 4, if the first ETL job is determined, at step S310, to not be a UTL-qualifying-job then processing proceeds to step S315 where notify mod 415 may notify the user (see Definitions sub-section, below) of this fact.

As shown in FIGS. 3 and 4, if the first ETL job is determined, at step S310, to be a UTL-qualifying-job then processing proceeds to step S325 where decompose mod 425 may decompose the first UTL job into an intermediate set of one or more jobs, such that each of the jobs of the intermediate set is a "Simple UTL Job." The definition of a Simple UTL Job is provided above in the SUMMARY section. It should be understood that a Simple UTL Job: (i) may still include some UTL portions; but (ii) is amenable to transformation to a transactionally equivalent CTL job using methods according to the present invention (which methods will be discussed, below).

As shown in FIGS. 3 and 4, processing proceeds to step S330 where transform intermediate set mod 430 may transform each Simple UTL Job of the intermediate set of UTL job(s) into CTL form and protocol so that there is a final set of CTL job(s), each of which is free of any UTL portions. An exemplary method for transforming a Simple UTL Job into CTL form and protocol will be provided, below.

As shown in FIGS. 3 and 4, processing proceeds to step S335 where run job mod 435 may run the final set of CTL job(s) on a source database to yield a target database (for example, changes to a pre-existing target database). In this embodiment, the CTL job(s) of the final set may be run according to currently conventional methods for running CTL jobs. Even though the CTL job(s) of the final set of job(s) may have been created automatically and under the control of software according to an embodiment of the present invention, this does not necessarily impact the manner in which the CTL job(s) are actually run on the databases involved.

As shown in FIGS. 3 and 4, processing proceeds to step S340 where repeat mod 440 may cause the final set of job(s) to be re-run according to the desired system design. For example, the final set of CTL job(s) may be run continuously so as to process changes to the source database(s) immediately when they occur. Alternatively, the final set of job(s) may be run at predetermined intervals.

Some embodiments of the present invention may use an automated tool to: (i) analyze an ETL job (that includes UTL portions); and (ii) generate one or more CTL jobs which would perform the same transformation as the ETL job (including its UTL portions). In cases where a client is creating a new CTL job, for which a corresponding ETL does not exist, some embodiments of the present invention may still provide value by allowing the client's job designers to use their existing ETL skills to define the transformation as an ETL job (including UTL portions), and then allow the automatic methods of the present invention to convert the ETL job into equivalent CTL job(s). Using Unload-Transform-Load (UTL) jobs to generate CTL jobs will now be discussed over the course of the following paragraphs.

In some embodiments of the present invention, the transformation to CTL relies on the concept of "eventual consistency." Eventual consistency means that: (i) the individual operations done against the target database may not always be providing the correct data; but (ii) the overall set of operations performed as part of a unit of work will make the target correct. In some embodiments of the present invention, eventual consistency is used in automating the process of transforming ETL jobs (that include UTL portions) into CTL jobs.

UTL and CTL jobs, as those terms are used in the present document, will now be defined. Some ETL jobs, and/or portions of ETL jobs, include an unloading of a portion of the data from the source database with the resulting data replacing a portion of the data in the target database. This will often involve the entirety of the data in the databases, but may sometimes involve just a portion as defined by some key ranges (for example, only the data from the last month). For purposes of this document, UTL jobs are defined as ETL jobs, or portions of ETL jobs, which include unloading. Alternatively, an ETL job, or a portion of an ETL job, may be limited to capturing the changes that occur in the source database and using this stream of changes to update the target database. For purposes of this document, CTL jobs are defined as jobs that use only changes, and do not include any unloading.

Some embodiments of the present invention generate a transformationally equivalent CTL job corresponding to a given UTL job. A UTL job may have a clear completion point. Once started it will finish as soon as it has unloaded and processed all the data from the source database. A CTL job will sometimes not have a clear completion point. It may be run continuously, processing changes as they occur in the source database. It can be run with a defined completion point though. It can process a specific time range of changes and end once it has finished those. For example it may be run once every 24 hours, each time processing the changes that occurred in the last 24 hours.

Consider a UTL Job (Job U) and a CTL Job (Job C). Job U and Job C can be considered transformationally equivalent if running Job U at Time T2 would produce the same results in the target database as the following series of two steps: (i) Run Job U at Time T1; and (ii) Run Job C at Time T2 processing all changes that occurred between T1 and T2. Note that, in some cases, a group of CTL jobs might together be transformationally equivalent to a single UTL job. If Job U is equivalent to the combination of Job C1 and Job C2, then running job U at Time T2 would produce the same results in the target database as the following two steps: (i) Run Job U at Time T1; and (ii) Run both Job C1 and Job C2 at Time T2 processing all changes that occurred between T1 and T2.

As will now be discussed, a target can be either of at least the following two types: (i) occasionally updated snapshot; or (ii) continuously changing. As mentioned above, a CTL job will often run continuously but can also be run with defined end points. It is an important business consideration whether or not to run a CTL job continuously. Depending on how the target data is to be used in a specific implementation, it may be helpful that the target data may remain static during specific time periods. A CTL job can have potential advantages even when used in this fashion. For example, if the target data can only be updated on weekends, moving from a weekly UTL job, to instead running the CTL job weekly to catch up on the week's changes, can reduce resource costs and execution time. This is because the work for the CTL job is based on the volume of data changes whereas the work for the UTL job is based on the total amount of data in the source database. For purposes of the present invention, it does not generally matter whether it is better to run continuously, or intermittently (that is, according to snapshot type), because embodiments of the present invention can be made by the system designer to be either continuously changing type or snapshot type.

Some general principles will now be discussed. In general, a UTL job is designed to operate on a static set of data. When data is retrieved from several tables from the source database the job will obtain a consistent snapshot of that data. When looking at any particular row in the source data, the UTL job is able to refer to any other piece of relevant data that occurred in the source database at the same time. A CTL job cannot, in general, make that assumption. At the time that the CTL job is processing an individual row level change, the source database is no longer in the state where that change was made. This difficulty of synchronizing the processing of a row level change can even occur when looking at changes made to two different tables in the source system.

The data flow through an ETL job may be designed to hold data of a given structure. It may be impractical to send data for more than one table through a single data flow, and also impractical to have several data flows that are essentially lock stepped so that there is only ever a single row of data in flight through the job. Some embodiments of the present invention provide automated job transformation which creates a CTL job that: (i) may send the changes for each table through its own respective data flow; and (ii) may allow those flows to be processed independently. This is possible because of the concept of eventual consistency. At the end of processing each individual row level change the target data may not be correct, but after processing a chunk of change data the target data will have become correct. These chunks may correspond to unit of work boundaries on the source system (comprising one or more source database transactions).

An example of the concept of eventual consistency comes from "join" operations. For the example, the target is a simple inner join of two source tables:
Source:
Table1 (Key, Col1)
Table2 (Key, Col2)
Table3 on the target is equivalent to Select * From Table1, Table2 Where Table1.Key=Table2.Key
The source tables already contain the following:
Table1: (1, "a")
Table2: (1, "b")
The following operations occur:
Update Table1 Set Col1="c" where Key=1;
Delete from Table2 Where Key=1;
In general, when processing the Update on Table1, the CTL job might want to do a lookup to retrieve the corresponding Col2 value from Table2 (so that it has the full set of data for Table3). But at the time it is processing the Update here, the row in Table2 may no longer exist in the source database. The lookup will return a null value for Col2 and so the CTL job might update Table 3 so that it has a row (1, "c", null). This is incorrect data, but it will only be incorrect temporarily because when the CTL job sees the following Delete operation it will delete that incorrect row from Table3.

An example of generating CTL jobs will now be discussed, including detailed steps for transforming a UTL job into a CTL job. These particular steps will work for a subset of UTL jobs which have the three UTL-qualifying-job characteristics respectively described in the following three paragraphs.

UTL-qualifying-job characteristic (1): ETL systems generally allow the inclusion of user defined actions in a job. This provides an extension point for the user (see Definitions, below) to insert its own business logic and transformation rules. Accordingly, UTL-qualifying-job characteristic (1) is that the ETL jobs should not include any user defined actions because the optimizer will not generally have sufficient knowledge about the behavior and dependencies of a user defined action.

UTL-qualifying-job characteristic (2): The UTL job should not contain any AGGREGATE actions.

UTL-qualifying-job characteristic (3): The UTL job should not utilize reject links from MERGE actions.

There are some "Simple UTL Jobs" which can be easily transformed into CTL jobs. Simple UTL Jobs are defined as jobs meeting the following criteria: (i) a single input action retrieves the contents of a single table (or view on a single table) in a database; (ii) contains no actions that operate on the entirety of the data for a job (SORT and/or AGGREGATE); (iii) contains no actions that rely on ordering of data (JOIN and/or MERGE); and (iv) all output stages operate on databases.

How to transform Simple UTL Jobs: (i) replace the input stage with a change capture stage programmed to receive change data from that database corresponding to the table/view that was being SELECTED; (ii) the output from the change capture stage will include an extra column that indicates if the operation is an INSERT or DELETE; (iii) note any UPDATE actions done on the source database will be delivered as a DELETE followed by an INSERT by this change capture stage; (iv) ensure that the extra column indicating the operation type is carried along unchanged throughout the job; and (v) change each output stage so that it is aware of the operation type and uses it to make the corresponding change to the table it is targeting (that is, either insert the new row or delete that row).

If there are two (or more) CTL jobs which operate on changes from the same source database (the same or different tables) they may be able to be combined into a single CTL job by combining their input stages. A single change capture stage can provide a separate data stream that can then be fed into the two independent streams. One value provided in combining multiple CTL jobs is that when they target the same database that means that the two replication streams can remain transactionally consistent.

If Jobs C1 and C2 are together transformationally equivalent to Job U, but are run independently, there may be times when the target database is not consistent with a single point of time. For example, if Job C1 had processed all the changes up to T1, but Job C2 has processed all the changes up to T2, then there is no Time T such that the target database corresponds to the state that would occur if Job U was run at Time T. However, if C1 and C2 are combined into a single CTL Job C, then there will always be a Time T such that the target database corresponds to the state that would occur if Job U was run at Time T. This means that Job C is transactionally equivalent to Job U.

The process of transforming the UTL job into one or more Simple UTL Jobs will now be discussed. A possible first step is to remove all SORT actions. This can be done safely as all operations that depend on sorting will also be removed. A possible second step is to transform any FUNNEL actions into a continuous mode rather than any sorting or other sequencing. This can be done safely as all operations that depend on sorting/ordering will have been removed. A possible third step removes all JOIN and MERGE actions.

Figure 5:
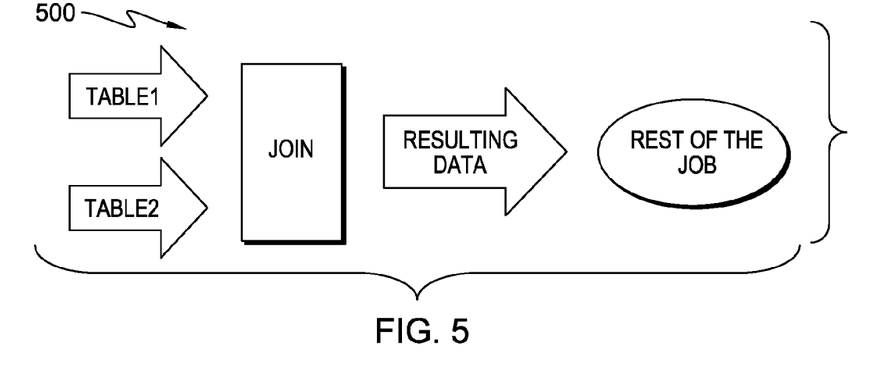
FIG. 5 is a process diagram helpful in understanding an embodiment of the present invention.
Figure 6:
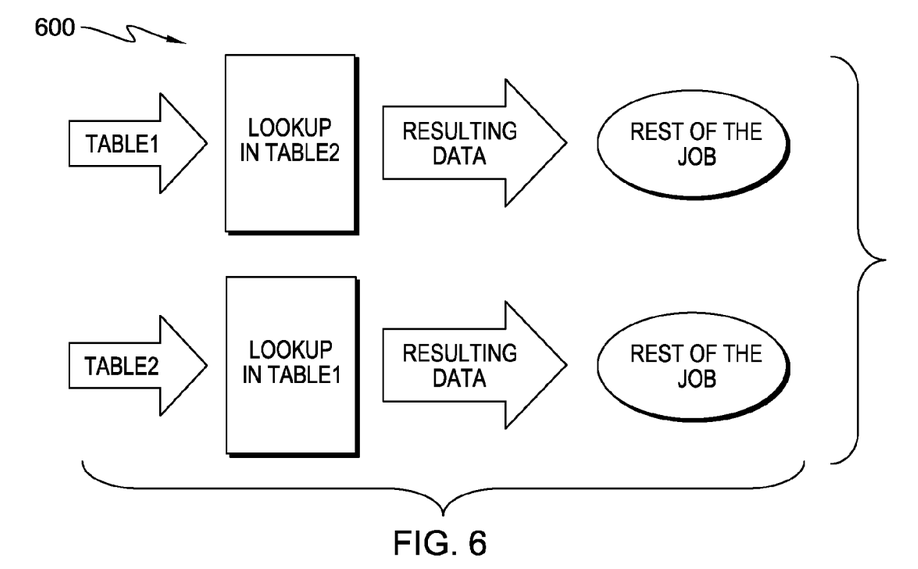
FIG. 6 is a process diagram helpful in understanding an embodiment of the present invention.

As shown in FIGS. 5 and 6, each JOIN or MERGE is transformed into a lookup action for each of the input links, as shown in diagram 500 (original fragment) and diagram 600 (resulting fragment). With the third step complete, the UTL job will have a number of independent data streams. Each of these can be separated into its own respective UTL job.

Figure 7:
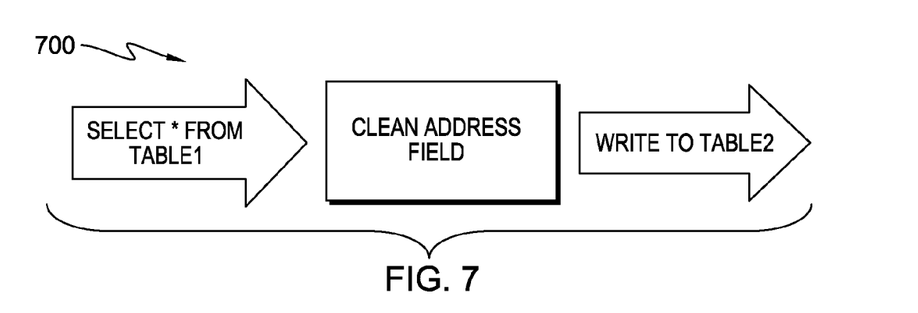
FIG. 7 is a process diagram helpful in understanding an embodiment of the present invention.
Figure 8:
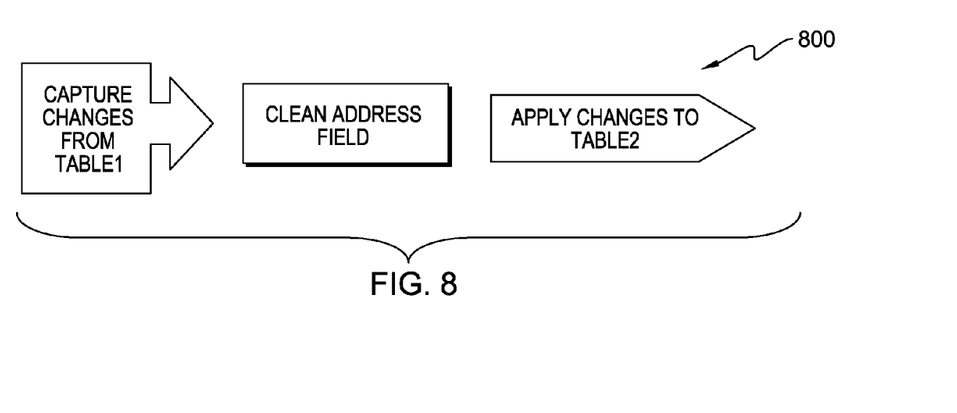
FIG. 8 is a process diagram helpful in understanding an embodiment of the present invention.

FIG. 7 shows diagram 700 of a Simple UTL Job according to this embodiment of the present invention, and FIG. 8 shows diagram 800 of an Equivalent CTL Job. If each of these individual UTL jobs satisfies the criteria of being a Simple UTL Job then processing can continue with the overall strategy, which proceeds to take the Simple UTL Job(s), as discussed above, and to apply processing to generate a respective corresponding transformationally equivalent CTL job. These CTL jobs may be combined into a single CTL job to provide a solution which is transformationally and transactionally equivalent to the original job. If the UTL job cannot be transformed into one or more Simple UTL jobs, or if the Simple UTL jobs involve different source and target databases so that the generated CTL jobs could not be combined, then this method may not be able to generate an equivalent CTL job.

Figure 9:
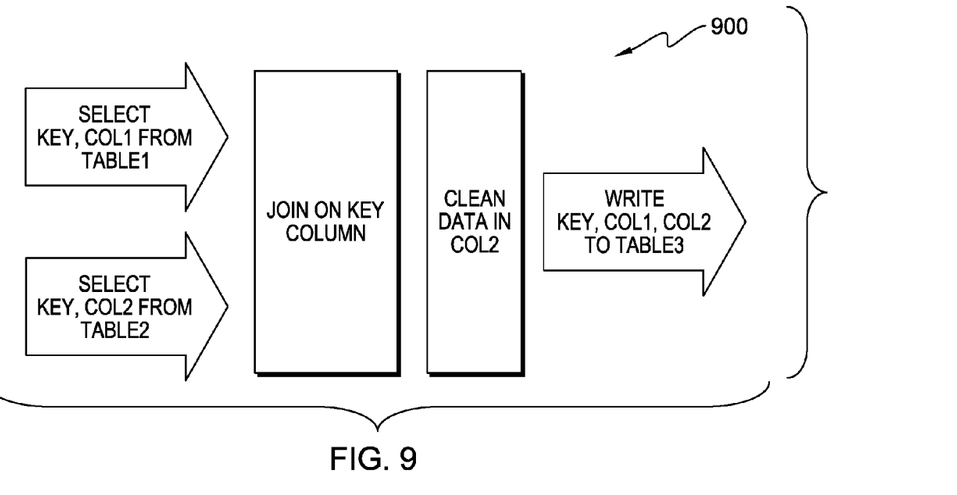
FIG. 9 is a process diagram helpful in understanding an embodiment of the present invention.
Figure 10:
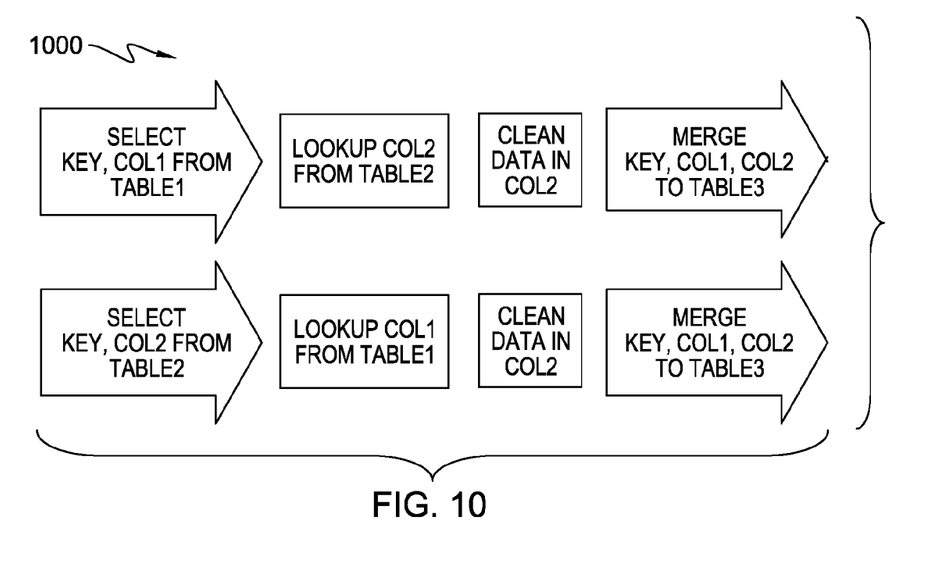
FIG. 10 is a process diagram helpful in understanding an embodiment of the present invention.
Figure 11:
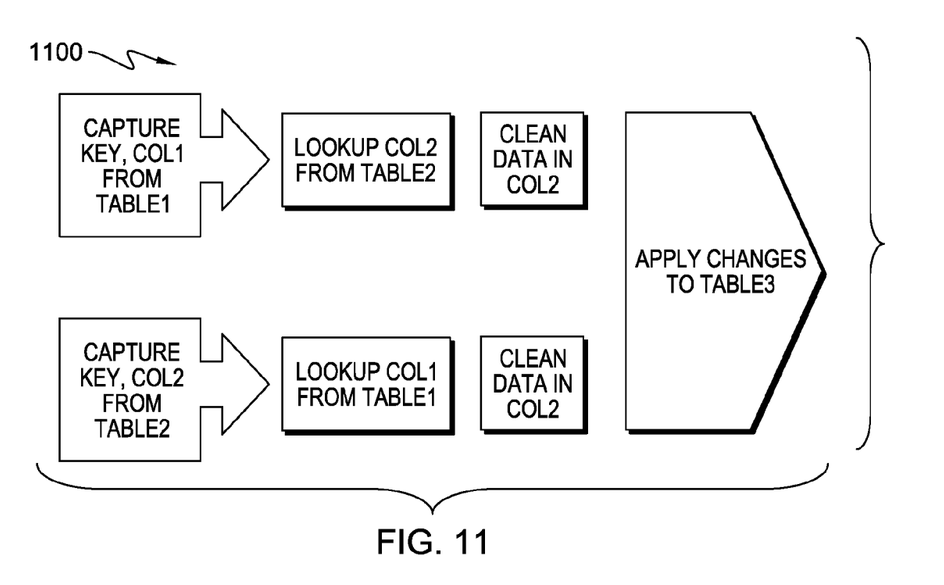
FIG. 11 is a process diagram helpful in understanding an embodiment of the present invention.

As shown in FIGS. 9, 10 and 11, another example of processing according to the present invention includes: (i) a UTL job doing a join and a lookup (see diagram 900); (ii) a first step where the original UTL job now has become two Simple UTL jobs (see diagram 1000); and (iii) a final step where a single multi-input CTL job has been obtained (see diagram 1100).

Some embodiments of the present invention may have one or more of the following features, advantages or characteristics: (i) provide a method that takes a generic ETL (or UTL) job and converts it into a CTL job(s); (ii) automatically convert or identify when such a conversion is not possible; (iii) identify the changes to the job; and/or (iv) provide improved guarantees in one or more of the following areas: (a) performance, (b) service level agreement (SLA), (c) transactional, and/or (d) recovery. In some embodiments of the present invention, the rules and constraints convert specific operations into equivalent operations while maintaining the guarantees listed in item (iv) of the previous sentence.

Some method embodiments of the present invention may include the following steps: (i) analyze the job from sources to targets (following dataflow); and (ii) performing decisions about equivalent conversions to real-time dataflow. Some embodiments of the present invention decide between the following job types: (i) continuous real-time; or (ii) scheduled change data capture (CDC). Continuous real-time type jobs translate to a CDC type while preserving the job integrity. Scheduled CDC type jobs may be easier to do, but still use a different model than the original job in one or more of the following aspects: (i) sources; (ii) targets, and/or (iii) intermediate operators.

Some embodiments of the present invention may have the advantage of latency reduction. This is because CTL is now the preferred technique in many information technology (IT) shops.

Some embodiments of the present invention may include a method where the target is continuously updated based on changes on the source side. When the target is a join of two source tables, some embodiments of the present invention create two separate streams each directly updating the target table.

What is claimed is:

1. A method for transforming a first extract transform load (ETL) job having at least one unload transform load (UTL) portion, the method comprising:
   decomposing the first ETL job into an intermediate set of one or more Simple UTL jobs;

for each Simple UTL job of the intermediate set, transforming the job into a transformationally equivalent job to yield a final set of one or more jobs that are a set of change-based transform load (CTL) job(s);

running the set of CTL job(s) on a source database to yield a target database; and running the final set of one or more jobs that are not UTL jobs on a set of at least one source database tables to yield a set of at least one target database tables;

wherein:

each Simple UTL job of the intermediate set jobs meets the following criteria:
- a single input action retrieves the contents of a single table, or view on a single table, in a database,
- contains no actions that operate on the entirety of data for a job,
- contains no actions that rely on ordering of data, and
- at least one output stage operates on a database.

2. A computer system for transforming a first extract transform load (ETL) job having at least one unload transform load (UTL) portion, the computer system comprising:

a processor(s) set; and a software storage device;

wherein:

the processor set is structured, located, connected or programmed to run software stored on the software storage device; and the software comprises:
first program instructions programmed to decompose the first ETL job into an intermediate set of one or more Simple UTL jobs, second program instructions programmed to, for each Simple UTL job of the intermediate set, transform the job into a transformationally equivalent job to yield a final set of one or more jobs that a set of change-based transform load (CTL) job(s), third program instructions programmed to run the set of CTL job(s) on a source database to yield a target database; and fourth program instructions programmed to run the final set of one or more jobs that are not UTL jobs on a set of at least one source database tables to yield a set of at least one target database tables;

wherein:

each Simple UTL job of the intermediate set jobs meets the following criteria:
- a single input action retrieves the contents of a single table, or view on a single table, in a database,
- contains no actions that operate on the entirety of data for a job,
- contains no actions that rely on ordering of data, and
- at least one output stage operates on a database.

* * * * *